Oct. 11, 1927.
J. M. GIBB ET AL
1,645,101
TIRE REPAIR TOOL
Filed Jan. 24, 1925
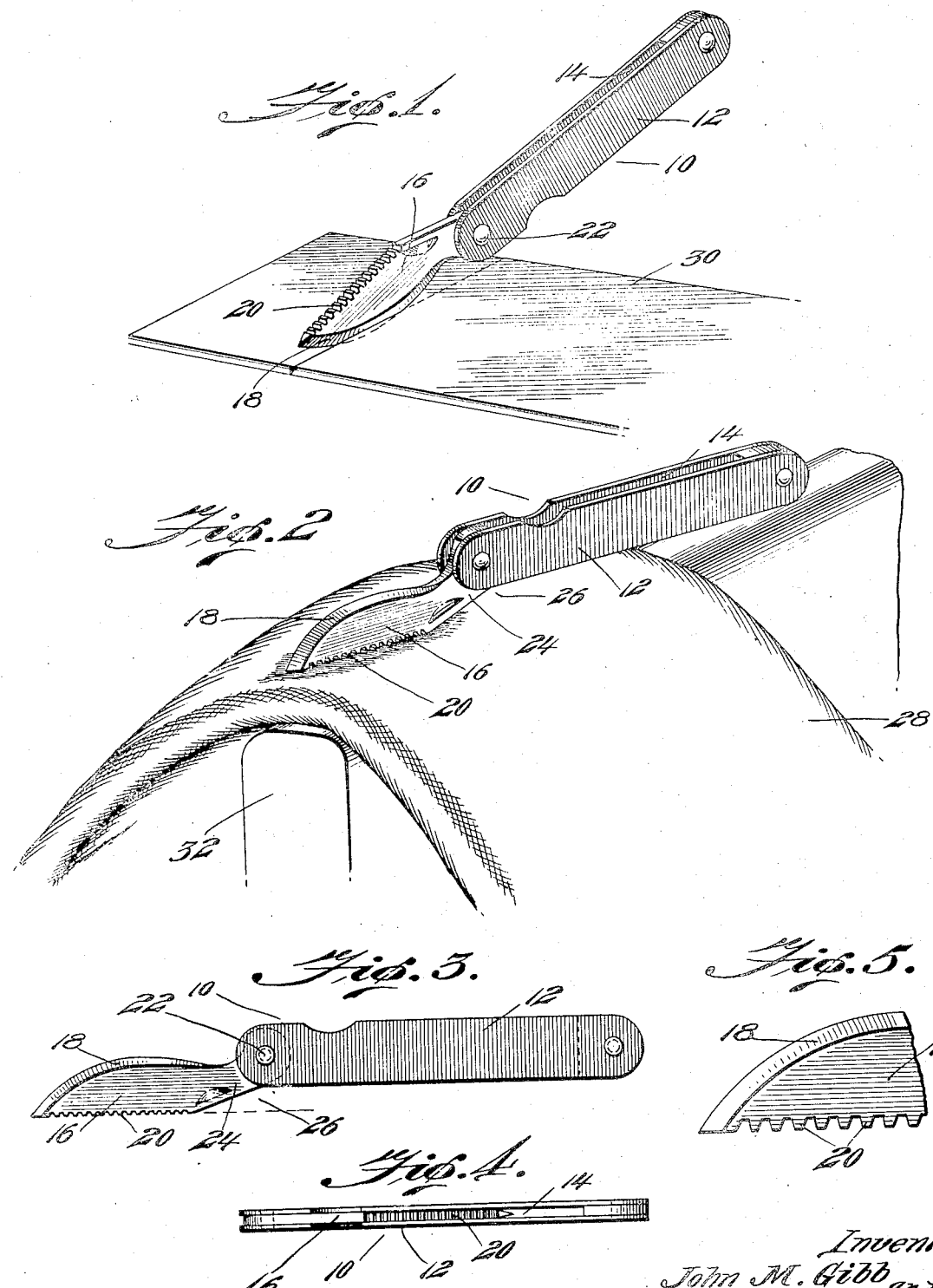
Inventor
John M. Gibb and
George M. Jobe
By Thomas A. Jenkins Jr.
Attorney Patented Oct. 11, 1927.

1,645,101

UNITED STATES PATENT OFFICE.

JOHN M. GIBB AND GEORGE M. JOBE, OF PROVIDENCE, RHODE ISLAND.

TIRE-REPAIR TOOL.

Application filed January 24, 1925. Serial No. 4,551.

Our invention relates to tools for repairing automobile tires, especially pneumatic tires used on most motor vehicles today.

So far as we are aware there is no suitable tool on the market today immediately accessible to repair a tire. This is particularly true where necessity compels one to repair a tire either in a garage or on a lonely spot on the highway. From a careful scrutiny we have found that no suitable tool is furnished as part of standard equipment or is on sale by tire accessory shops. The main object of our invention is to provide a tool especially designed and adapted for this purpose which may be folded over to be carried in the pocket of the driver or kept in the car and which may be at all times accessible for this purpose. Whenever it is desired to repair the inner tube or a tire it is usually necessary to cut out a space around the hole, blow out or puncture and to roughen the adjacent surface of the tube to provide a surface for the rubber cement to bind the patch to the tube. It is also necessary at times to cut down the side of the patch and also to smooth off its surface for the same purpose. To this end, we have provided a tool which preferably comprises a usual jack knife handle having a compartment therein for a blade and a combination blade especially designed for this purpose pivotally mounted on said handle adapted to either fit within the compartment or to be swung into operative position. We are aware that tools provided with a combination blade, having a knife edge on one side thereof and a saw edge on the opposite side thereof are old. If a tool of this type is used however to roughen a rubber surface by means of scraping it is obvious that the saw teeth would cut through the soft rubber surface. It is also obvious that if one side of the blade were provided with file teeth of ordinary construction, they would not function on a rubber surface to properly roughen it. To this end we have provided a combination blade comprising a member of substantial width having file teeth preferably of rack tooth construction cut across the entire width of one edge of said blade. It is obvious that file teeth of this construction are peculiarly adapted to roughen a rubber surface. A further object of our invention therefore is to provide a tire tool having a combination blade having one edge thereof provided with file teeth of peculiar construction adapted to roughen a rubber surface.

In order that a knife edge may be conveniently accessible for cutting off portions of patches and enlarging the puncture holes in a tire, we provide the opposite side of said combination blade with a knife edge. It is obvious that after the desired portions are cut it is merely necessary to turn the tool over to have the necessary file edge accessible for roughening the rubber surface. In order that the tool may be readily grasped in the hand without interfering with its scraping function, we so shape the blade and the pivotal connection to the handle that when the blade is swung into operative position the plane of the file teeth will be offset from the substantially parallel plane of the handle, a feature we believe new in jack knives or tools of this description.

These and such other objects of our invention as may hereinafter appear will be best understood from a description of the accompanying drawings which illustrate one embodiment thereof.

In the drawings, Fig. 1 is a perspective view of our invention with the combination blade pivoted to a position whereby it may be used to permit the knife edge to cut a rubber surface.

Fig. 2 is a perspective view of our invention being employed to scrape the surface of a tube, showing particularly how the plane of the file teeth is offset from the plane of the handle.

Fig. 3 is a side elevation of our invention with the combination blade pivoted so that the file teeth may function.

Fig. 4 is a plan view of our invention with the combination blade pivoted within the compartment.

Fig. 5 is a fragmentary side elevation of the end of the combination blade.

In the drawings, wherein like characters of reference indicate like parts throughout, 10 generally indicates our invention. Said invention has the handle portion 12 of usual jack knife construction having the compartment 14 for the reception of the blade. We provide a combination blade 16 which comprises a member of a substantial width having a knife edge 18 formed on one side thereof for cutting a tire or patch fabric and the file teeth 20 cut across the entire width of the opposite side thereof for roughening a rubber fabric. These teeth 20 are cut across the entire width of the combination blade 16 to provide a file surface rather than a saw surface, in order not to cut the rubber fabric. In order that said teeth 20 may roughen a rubber fabric, they are preferably constructed in the shape of rack teeth along the edge of said blade 16. In order that the combination blade 16 may be conveniently folded within the compartment 14 of the handle 12 we pivotally mount said blade 16 on one end of said handle 12 by means of the pivot pin 22. In order that the handle 12, which may form an integral unit with the blade 16, may be readily grasped by the hand in the scraping operation we so downwardly taper the portion of the blade 24 adjacent to the pivot pin 22 and we so mount it on the handle 12 that when the blade 16 is swung to operative position the plane of the file teeth 20 will be substantially parallel to the plane of the handle but offset therefrom as at 26 so that the user's fingers may have space to operate in the space 26 between the tire fabric 28 and the handle 12 as shown in Fig. 2.

The operation of our invention is obvious from the above description. The combination blade 16 is swung into operative position and the knife edge 18 thereof may be employed as in Fig. 1 to cut the patch 30 or the tire tube 28 as desired. Our invention 10 then may be conveniently swung over so that the file teeth 20 may contact the surface of the rubber fabric either the patch 30 desired to be roughened or the surface of the tire tube 28 desired to be prepared. Fig. 2 shows my invention in operative position scraping and preparing the surface of a tire tube 28 adjacent to the puncture hole mounted on any suitable object 32. Fig. 5 illustrates in detail the rack tooth construction of the file teeth 20.

It is obvious that we have provided an especially constructed tire tool readily carried by the user and at all times accessible having a combination blade designed to perform all the necessary functions of a tool for repairing a tire.

It is understood that our invention is not limited to the specific embodiment shown and that various deviations may be made therefrom without departing from the spirit and scope of the appended claims.

What we claim as new and desire to secure as Letters Patent is:

1. A tire repair tool comprising a handle having a compartment therein for the reception of a blade, a blade comprising a member of a substantial width having file teeth of rack tooth construction cut across the entire width of one edge of said blade for roughening the surface of a rubber fabric and means to pivotally join said blade to said handle whereby said blade may be pivoted into the compartment, the shape of the blade being such that when swung into operative position the plane of the file teeth will be offset from the substantially parallel plane of the handle.

2. A tire repair tool comprising a handle having a compartment therein for the reception of a blade, a blade comprising a member having file teeth cut across one edge of said blade for roughening the surface of a rubber fabric and means to pivotally join said blade to said handle whereby said blade may be pivoted into the compartment, the shape of the blade being such that when swung into operative position the plane of the file teeth will be offset from the substantially parallel plane of the handle.

In testimony whereof we affix our signatures.

JOHN M. GIBB.
GEORGE M. JOBE.